Sept. 8, 1942.    R. A. OPENSHAW    2,294,929
BALER PRESS
Filed Aug. 29, 1939    8 Sheets-Sheet 1
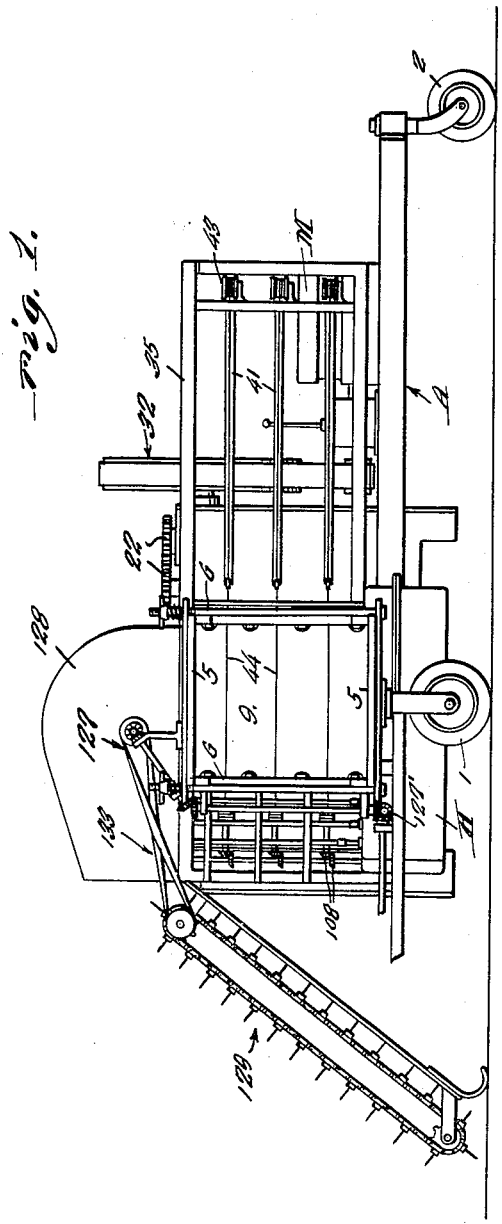
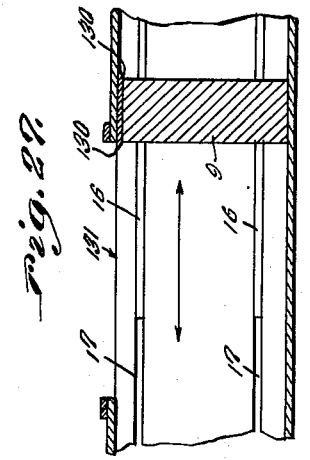
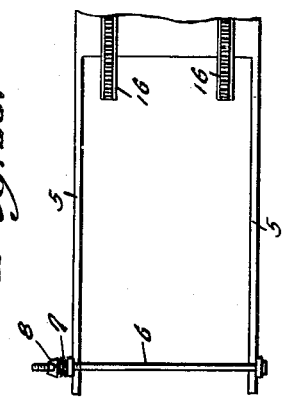
Inventor
R.A. Openshaw
By Clarence A. O'Brien
and Hyman Berman
Attorneys

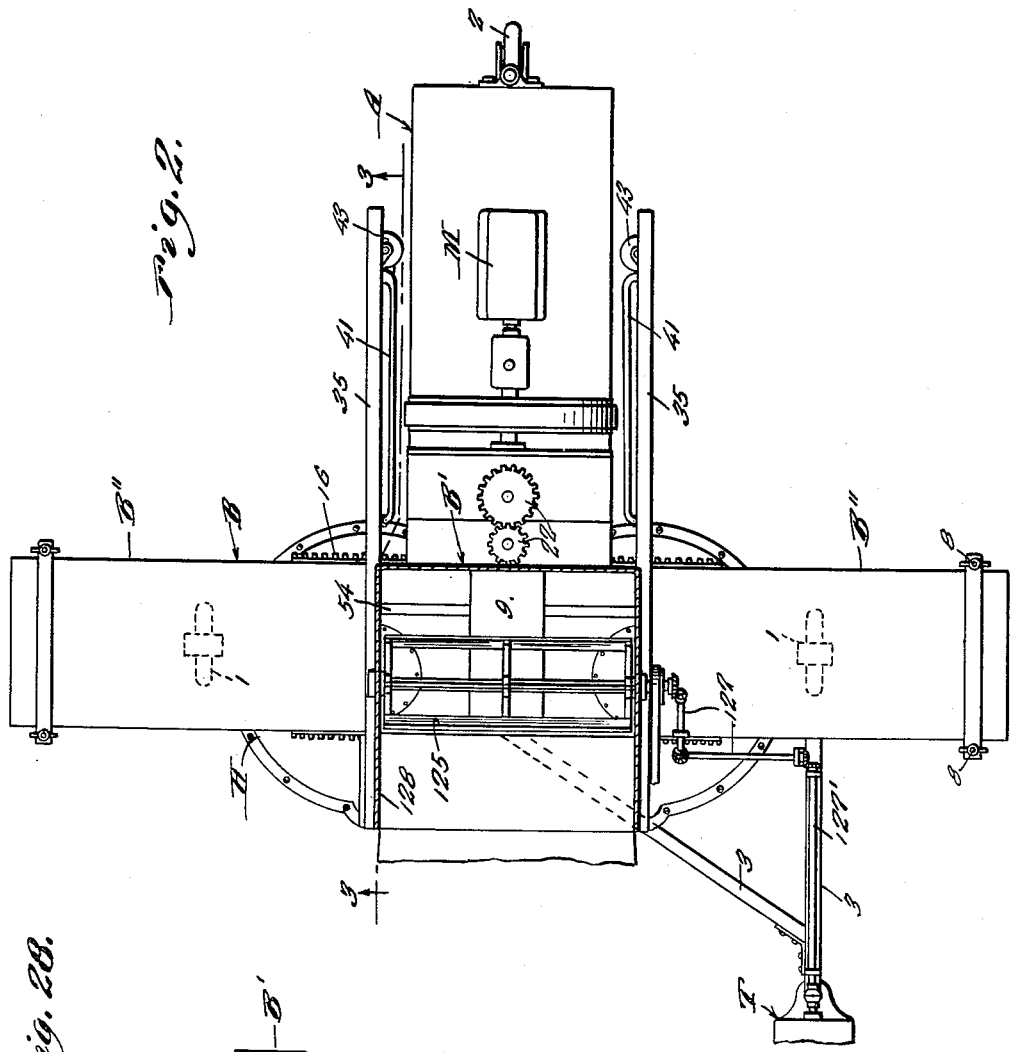

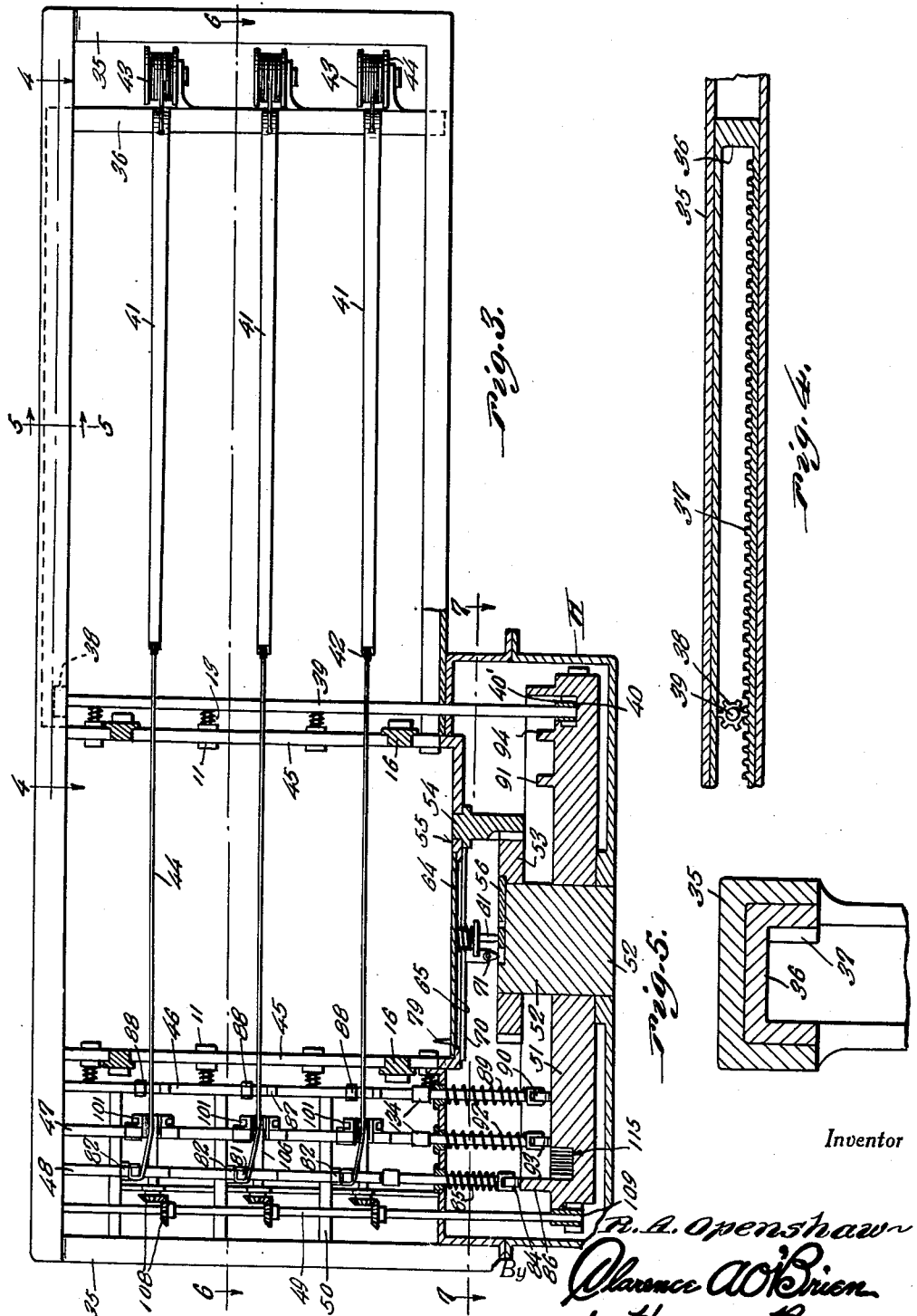

Sept. 8, 1942.　　　R. A. OPENSHAW　　　2,294,929
BALER PRESS
Filed Aug. 29, 1939　　　8 Sheets-Sheet 4
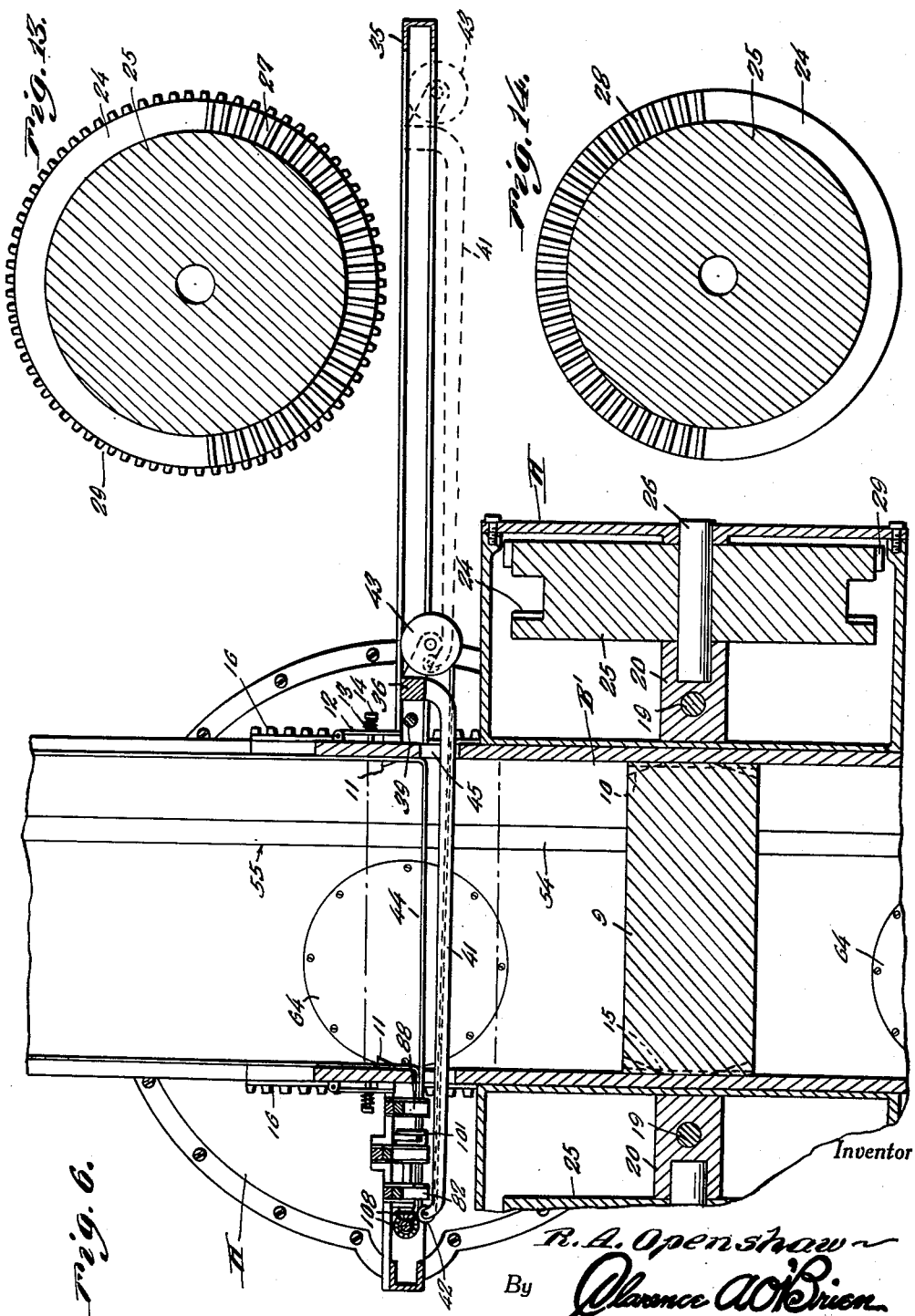
Inventor
R. A. Openshaw
By Clarence A. O'Brien
and Hyman Berman
Attorneys Sept. 8, 1942.  R. A. OPENSHAW  2,294,929
BALER PRESS
Filed Aug. 29, 1939  8 Sheets-Sheet 5
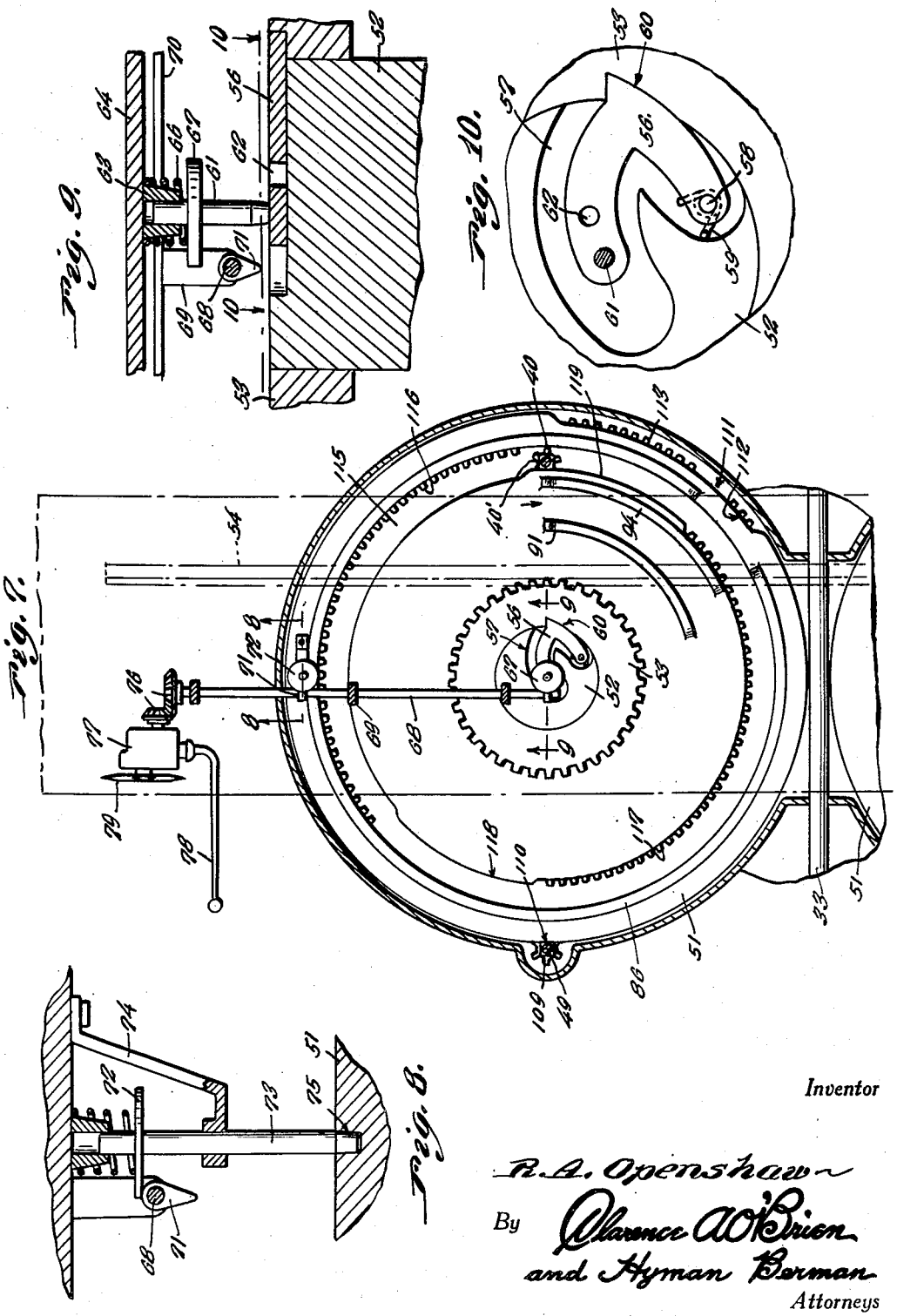
Inventor
R. A. Openshaw
By Clarence A. O'Brien
and Hyman Berman
Attorneys Sept. 8, 1942.  R. A. OPENSHAW  2,294,929
BALER PRESS
Filed Aug. 29, 1939  8 Sheets-Sheet 6
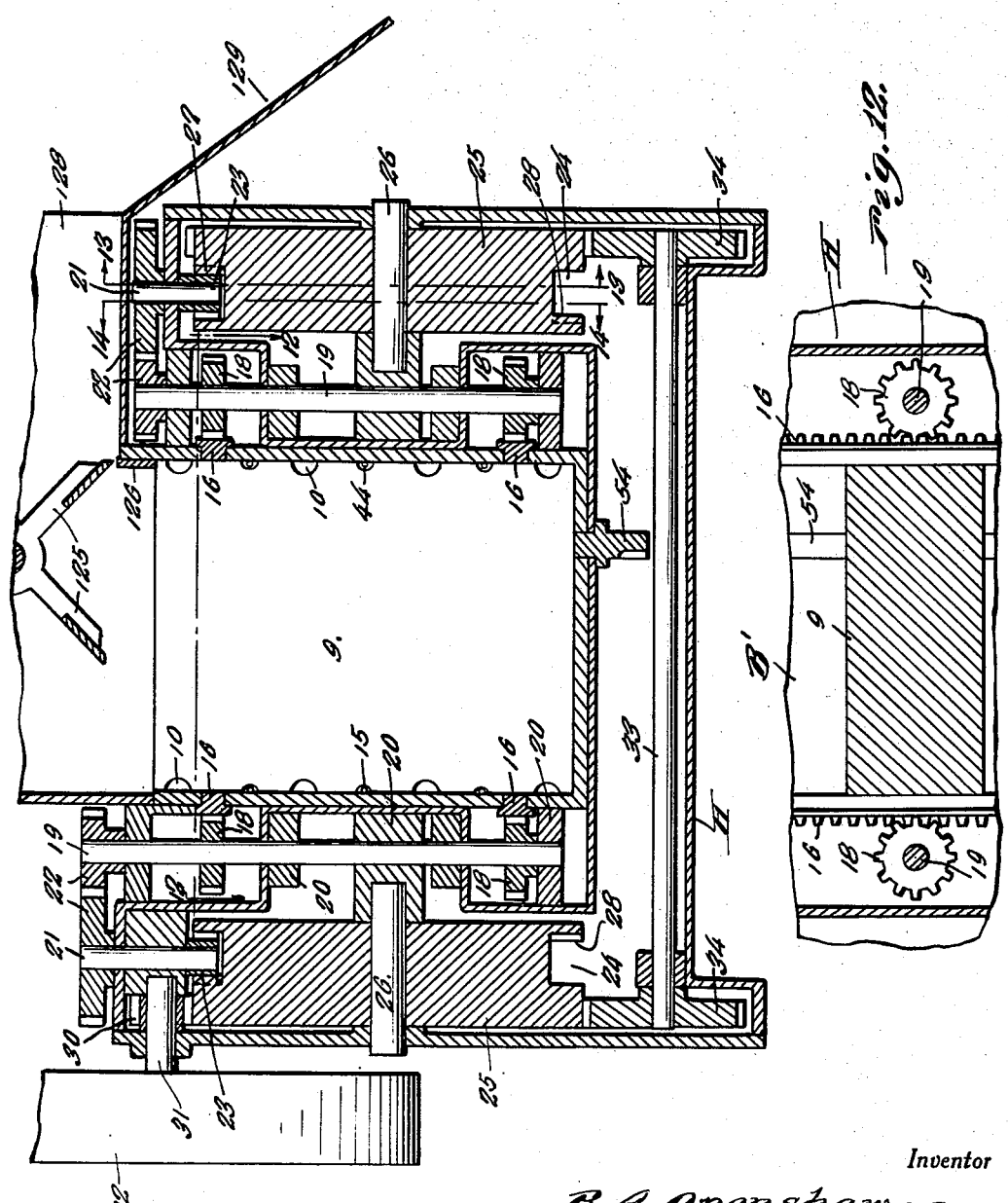
Inventor
R. A. Openshaw
By Clarence A. O'Brien
and Hyman Berman
Attorneys Sept. 8, 1942.  R. A. OPENSHAW  2,294,929
BALER PRESS
Filed Aug. 29, 1939  8 Sheets-Sheet 7
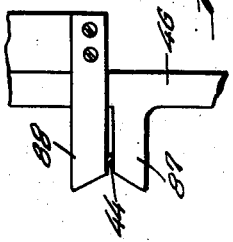
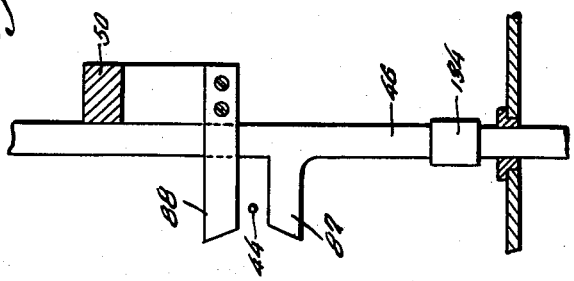
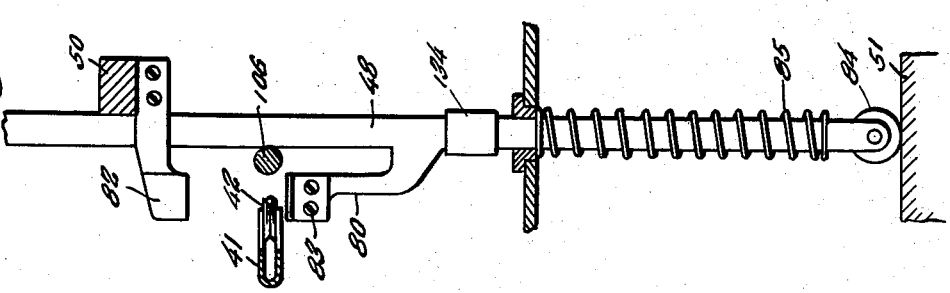
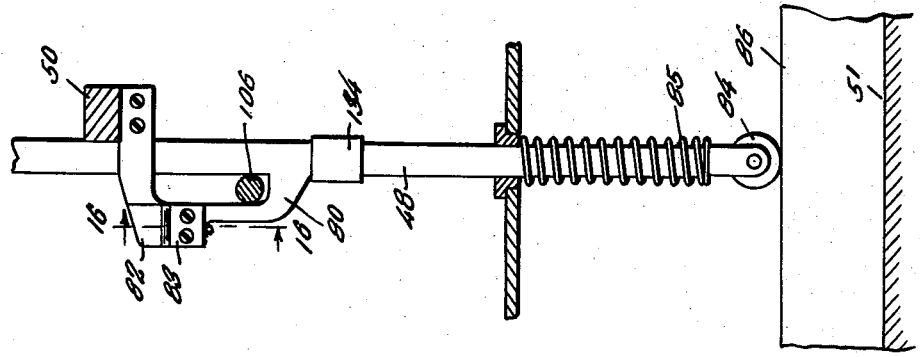
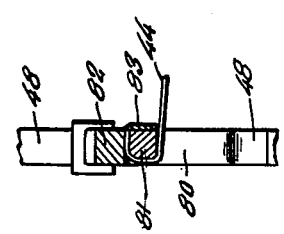
Inventor
R. A. Openshaw
By Clarence A. O'Brien
and Hyman Berman
Attorneys

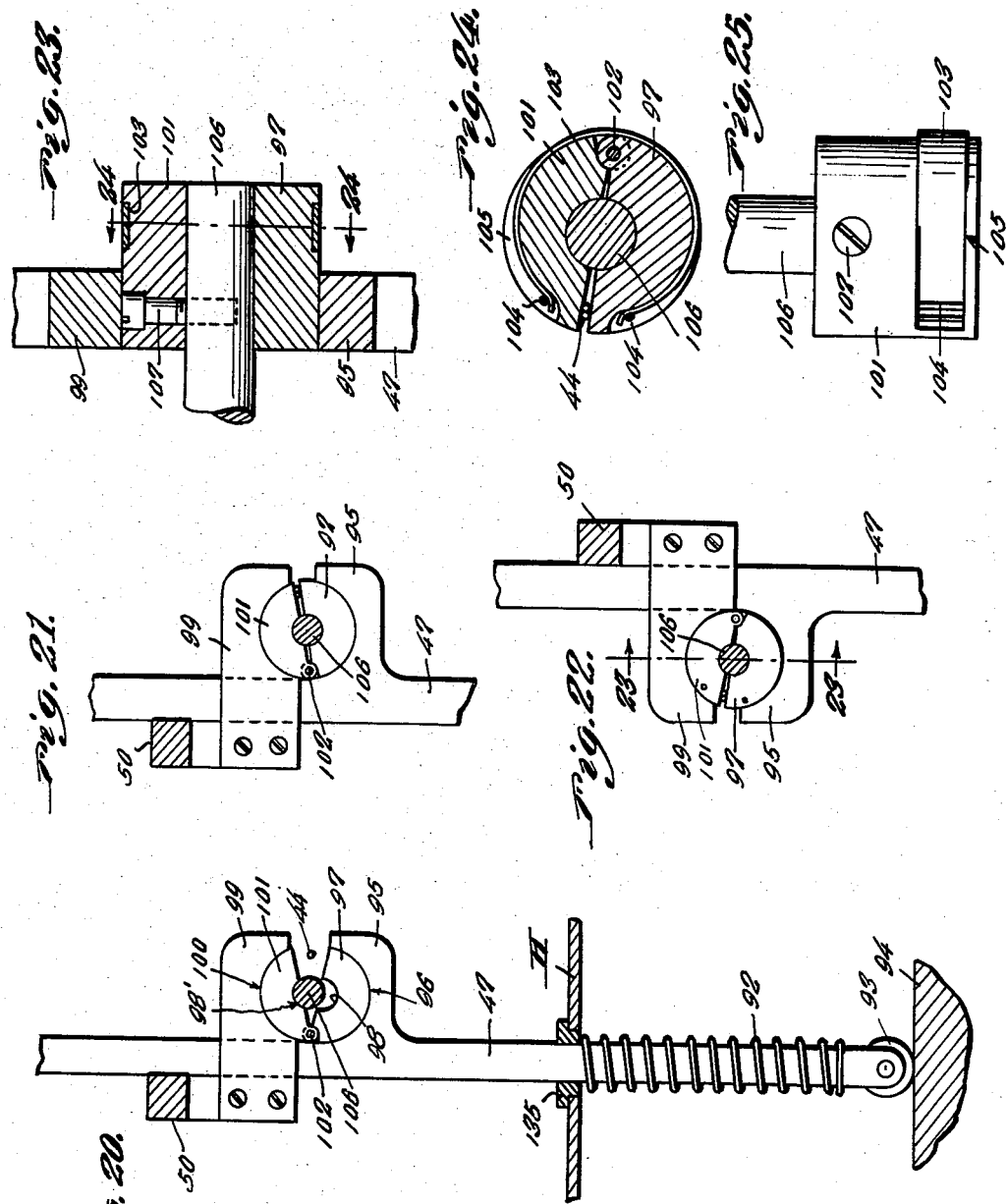

Patented Sept. 8, 1942

2,294,929

UNITED STATES PATENT OFFICE 2,294,929

BALER PRESS

Ralph A. Openshaw, Mesa, Ariz.

Application August 29, 1939, Serial No. 292,470

3 Claims. (Cl. 100—20)

This invention relates to a baler press for baling hay, straw, etc., the general objects of the invention being to provide a press having a double action plunger for forming two bales as it moves back and forth in the body of the press, with simple means for reciprocating the plunger, means actuated by the movement of the plunger for positioning wires in the press to encircle the bales and to twist the ends of the wires together, with the principal parts enclosed so that they are protected from dust and other foreign matter and may operate in lubricant.

Another object of the invention is to provide means whereby the press can be adjusted to make bales of different sizes and also to provide means for chopping the hay as it enters the press so that the chopped hay is baled immediately after being chopped.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevational view of the invention.

Figure 2 is a top plan view thereof and showing a portion of a tractor with drive means leading from the tractor to certain parts of the apparatus.

Figure 3 is a section on the line 3—3 of Figure 2.

Figure 4 is a section on the line 4—4 of Figure 3.

Figure 5 is a section on the line 5—5 of Figure 3.

Figure 6 is a section on the line 6—6 of Figure 3.

Figure 7 is a section on the line 7—7 of Figure 3.

Figure 8 is a section on the line 8—8 of Figure 7.

Figure 9 is a section on the line 9—9 of Figure 7.

Figure 10 is a section on the line 10—10 of Figure 9.

Figure 11 is a transverse vertical sectional view through the approximate center of the press and showing the means for reciprocating the plunger.

Figure 12 is a section on the line 12—12 of Figure 11.

Figure 13 is a section on the line 13—13 of Figure 11.

Figure 14 is a section on the line 14—14 of Figure 11.

Figure 15 is an elevation of the wire cutting and clamping means.

Figure 16 is a section on the line 16—16 of Figure 15.

Figure 17 is a view similar to Figure 15 but showing the parts in a different position.

Figure 18 is a fragmentary elevation showing the clamping means for the wire in open position.

Figure 19 is a detail view showing the clamping means in closed position.

Figure 20 is a view of the means for twisting the wire.

Figure 21 is a detail view showing the jaw members of the twisting means in closed position.

Figure 22 is a view similar to Figure 21 but looking at the opposite sides of the parts shown in Figure 21.

Figure 23 is a section on the line 23—23 of Figure 22.

Figure 24 is a section on the line 24—24 of Figure 23.

Figure 25 is a plan view of the shaft and the upper jaw with the spring shown in Figure 23.

Figure 26 is a fragmentary side view looking into one end part of the press box.

Figure 27 is a vertical longitudinal sectional view through the central part of the press box and through the plunger showing a different form of cutting means from that shown in the other view.

Figure 28 is a detail vertical sectional view showing a feeding means for feeding the material coming from the conveyor into the box as constructed as shown in Figure 27.

In these drawings, the letter A indicates the supporting structure as a whole, and said structure is provided with the front wheels 1 and the rear caster wheels 2 and Figure 2 shows the implement being propelled through means of a tractor a part of which is shown at T, the tractor being suitably connected with the implement, such as by the beams 3, though it is to be understood that the implement can be propelled in any suitable or desired manner. The press box is shown generally at B and extends at right angles to the direction of travel of the apparatus and said box includes the central portion B' formed with a bottom and side walls and the two end portions B'', each of which is formed with a top and bottom parts 5 of resilient material with the two parts yieldingly connected together by the bolts 6 carrying the springs 7 and nuts 8 so that the top and bottom parts can be adjusted toward and away from each other in the usual manner and these parts being so arranged as to apply pressure to the bale being formed as it is pushed between the top and bottom members 5. This feature is clearly shown in Figure 26.

The reciprocatory plunger is shown at 9 and operates in the part B' of the box and the side edges of this plunger 9 is formed with the recesses 10 for clearing the usual retainers 11 arranged in each end of the part B' of the box and carried by the hinged strips 12 which are pressed inwardly by the springs 13 on the bolts 14, see Figure 6, these retainers acting to prevent retrograde movement of the bales being formed by the plunger. The side edges of the plunger are also formed with the small grooves 15, see Figure 11, for the binding wires.

As before stated this plunger moves back and forth in the press box and forms a pair of bales simultaneously. Upper and lower rack bars 16 are attached to the side edges of the plunger and these bars pass through longitudinally extending slots 17 in the side walls of the central portion of the box, this arrangement being shown more clearly in Figure 27.

These racks are engaged by the toothed wheels 18 on the vertical shafts 19, one of which is arranged at each side of the central part of the box, these shafts being journaled in the parts 20 forming parts of the structure and said shafts pass through portions of vertical parts of a housing H. Each shaft 19 is driven from a stub shaft 21 through means of the gears 22 and each stub shaft has a pinion 23 attached to its lower end, said pinion operating in an annular groove 24 in a wheel 25 rotatably supported in the housing by a shaft 26. Each wheel 25 has teeth 27 on substantially half of the circumference of one side wall of the groove and teeth 28 on substantially half of the other side wall of the groove, the two sets of teeth 27 and 28 being arranged on opposite halves of the two side walls as shown in Figures 13 and 14 with the end teeth of the two sets spaced apart a sufficient distance so that the pinion 23 will not engage the two sets simultaneously. Each wheel 25 has an annular set of teeth 29 on its circumference and these teeth of one wheel are engaged by a pinion 30 and a shaft 31, journaled in the housing H and having a large wheel 32 attached to its outer end which is suitably driven from a motor M on the implement. Motion of one wheel 25 is communicated to the other wheel 25 through means of a shaft 33 journaled in the bottom of the housing H and having gears 34 on its ends, one of which meshes with the gear teeth 29 of one wheel 25 and the other with the similar teeth 29 of the other wheel 25 as shown in Figure 11.

Thus the rotary movement of the two wheels 25 through the shafts 21, gears 22 and toothed wheels 18 and the racks 16 cause reciprocatory motion of the plunger to make the plunger form bales at both end parts of the box simultaneously. Of course, the parts will be moved in a direction to move the plunger in one direction when the pinions 23 are engaging the teeth 27 and then as the pinions 23 leave the teeth 27 they will engage the teeth 28 which reverses the motion of the pinions 23 and thus the parts are caused to move the plunger in an opposite direction. As before stated there is sufficient space between the two sets of teeth 27 and 28 as to permit the pinions to practically stop rotating before they engage the second set of teeth and this action of reversing the movement of the plunger is performed without jerking for as the plunger nears the end of its stroke it is pressing upon the hay in the bale which tends to force the plunger in the opposite direction so that as soon as the pinions 23 pass from one set of teeth in the grooves of the wheels 25 the pressure of the hay on the plunger tends to move the parts to cause the pinions to start rotating in an opposite direction so that as the pinions are engaged by the other set of teeth they are moved in the same direction in which the pressure of the hay on the plunger tends to rotate them and thus the change is made without shock or jar or any jerking movement of the parts.

A pair of upright frames 35 extend longitudinally on the structure and at right angles to the press box and these frames cross portions of the box one adjacent each end at the central portion B' thereof. The members of each frame are of channel shape in cross section and portions of the frame form a track for the needle frame 36 which is also formed of channel stock and has an elongated upper member slidably arranged in the upper member of the frame 35, see Figures 3, 4 and 5, and this upper member of the frame 36 has the rack teeth 37 formed on one of its internal side walls for engagement by a pinion 38 fastened to the upper end of a shaft 39 vertically supported in the structure and having its lower end entering a bottom extension of the housing H, the lower end of the shaft being provided with a pinion 40. The horizontal member of the frame 36 carries the elongated needles 41 which are horizontally arranged as shown in Figure 3, each needle having a curved portion at that end which is connected to said vertical member of the frame 36, as shown in Figure 6, so that the major portion of the needle is offset from the frame 36 and said needle is of substantially U-shape in cross section as shown in Figure 17 with its limbs forming a space for the wire and at the free end each needle is slightly curved toward the open side thereof and carries a pulley 42 for the wire, the curved free end of the needle offsetting the pulley 42 so that it can pass between the jaws of the clamping, twisting and cutting members, to be described, so as to place the wire between said jaws. The vertical member of the frame 36 also carries the reels 43 for the wires 44 and the connected ends of the needles have holes therein for the entrance of the wires as they come from the reels as shown in Figures 3 and 6. These reels are of the usual construction and are provided with spring means for holding the wires under a certain amount of tension to resist unwinding of the wires from the reels. The side walls of the part B' of the box are formed with the slots 45, adjacent each end of said part B', for the passage of the needles and wires and while Figure 3 shows the free ends of the needles as spaced a considerable distance from the near side wall of the part B', to avoid confusion, in actual practice the pulleys 42 at said free ends of the needles would lie practically in the slots 45 in said near side wall of the box when the needle frame was in retracted or neutral position as shown in Figure 3.

Each frame 35 movably supports a shaft 46 forming part of clamping means for the wires, a shaft 47 forming part of wire twisting means and a shaft 48 forming part of wire holding and cutting means and the frame also rotatably supports a vertical shaft 49. The four shafts are located in the frame 35 to that side of the presser box opposite the side containing the needle frame 36 and the lower ends of the four shafts extend into the bottom extension of the housing H as shown more particularly in Figure 3. This side or end of each frame 35 also has the short longitudinally extending members 50 therein for supporting certain parts of the wire handling mechanism.

A master wheel 51 is provided for actuating each set of wire handling mechanism, these wheels being located in the bottom extensions of the housing H. Each wheel 51 is carried by a vertically arranged stub shaft 52 journaled in the housing and a toothed wheel 53 is rotatably arranged on the upper end of each stub shaft 52. These wheels 53 are engaged by an elongated rock bar 54 attached to the bottom of the plunger and operating in a slot 55 in the bottom of the central portion of the box so that movement of the plunger will rotate the wheels 53 first in one direction and then in the other as the plunger reciprocates in the box. However, as the wheels 53 are rotatably arranged on the shafts 52 this movement is not communicated to the master wheels 51 until the wheels 53 are connected with the shafts 52 by the dogs 56 operating in recesses in the upper ends of the shafts 52.

As shown in Figures 7 and 10 each dog 56 is of substantially V-shape with the end of one limb pivoted in the recess 57 in the upper end of the shaft 52 by a pin 58 and a spring 59 associated with the pin 58 tends to move the dog outwardly to cause the dog to engage a notch 60 formed in the inner circumference of the wheel 53. This notch 60 is so formed that when the dog is engaging the same the wheel 53 can rotate in one direction but cannot rotate in the opposite direction without rotating shaft 52.

The dog is normally held in a retracted position and out of the notch 60 by a plunger 61 engaging a hole 62 in the dog, said plunger being supported for vertical movement in a boss 63 depending from a cover plate 64 which closes an opening 65 in the bottom of the presser box located over the shaft 52 and the wheel 53. A spring 66 engages a disk 67 on the plunger 61 and tends to force the plunger 61 downwardly against the dog. However, the tension of this spring 66 is not sufficient to prevent movement of the dog by the spring 59. The spring 66 will force the plunger 61 in the hole 62 when the dog has been moved to a position to place the hole 62 under the plunger 61.

A shaft 68 is supported by the hangers 69, some of which depend from the supporting cross members 70 attached to the bottom or underside of the box and said shaft carries the cams 71 one of which is designed to engage the disk 67 of the plunger 61 when the shaft has been rotated to a position where the cams 71 will extend upwardly from the position shown in Figure 7. The other cam engages the disk 72 of a spring pressed plunger 73 carried by a bracket 74, see Figure 8, depending from a part of the structure and located within the housing. This plunger is adapted to engage a hole 75 in the master wheel when said hole comes under the plunger as shown in Figures 7 and 8 so as to prevent movement of the master wheel until the cam 71 on the shaft 68 raises the plunger. The two cams are so arranged that they will simultaneously raise the two plungers thus freeing the master wheel and the dog simultaneously and they will also lock the dog and master wheel against movement simultaneously. The shaft 68 is connected by gears 76 to a conventional form of speed change device shown at 77 in Figure 7, the gears of this device being changed by manipulation of the lever 78 and the operating shaft of this device is provided with a star wheel 79, the points of which successively project through the bottom of the presser box, as shown in Figure 3 so that the star wheel is rotated by the bales being formed and by providing this change speed device 77 actuated by the bales the apparatus can be set to form bales of different lengths by simply shifting the gearing in the member 77 to provide a proper movement of the parts for communicating movement of the star wheel 79 by a bale being formed to the shaft 68 so that the shaft 68 will move the cams 71 into engagement with the plungers 61 and 73 when the bale is of the desired size and this raising of the plungers will release the master wheels and the dogs 56 so that the wire handling mechanisms will come into operation.

Of course, the releasing of the dogs 56 by the plungers 61 will permit the springs 59 to move the dogs to the position shown in Figures 7 and 10 to interlock the wheels 53 with the shafts 52. This will cause the reciprocatory movement of the plunger to rotate the shafts 52 and the master wheels 51.

In starting new bales the wires 44 and the frame 36 are in the position shown in Figure 3 with the ends of the wires 44 held by the clamping mechanism, a part of which is formed by the shaft 48. As shown in Figures 3, 15, 16 and 17, the shaft 48 is formed with an upstanding arm 80, one for each of the wires 44, the arm being offset from the shaft and its upper end forms a jaw 81 cooperating with a jaw 82 fastened to a member 50. The movable jaw 81 has a knife 83 attached thereto which will cut the wire as it is being clamped between the jaws so that a portion of the wire after being cut is held between the two jaws as shown in Figure 16, the wire, the end of which is held by the jaws passing to the needle and through the same to the reel as shown in Figure 3. The shaft 48 is supported for vertical movement and has a roller 84 at its lower end and a spring 85 on the lower part of the shaft 48 presses the roller against an annular upstanding flange or rib 86 on the master wheel 51. As will be seen from Figure 7 this rib or flange 86 has its ends spaced apart a short distance with said ends rounded so that the roller can readily run up or down the same. As will be seen the master wheel will hold the shaft 48 in raised position with the jaws 81 and 82 gripping the wire for the major portion of the revolution of the master wheel but for a short distance of the revolution the shaft will be lowered as the roller travels in the space between the ends of the flange. Of course, as the shaft 48 moves downwardly the jaws will move apart as shown in Figure 17.

The shaft 46 is provided with the jaw forming arms 87, one for each wire, and each arm is associated with a stationary jaw member 88 carried by a member 50, these jaws gripping the wires 44 when the shaft 46 is raised, as shown in Figure 19. This shaft 46 is normally held in depressed position by a spring 89 with its roller 90 engaging the upper face of the master wheel 51 for the greater part of a revolution of the master wheel but said shaft 46 is raised when the roller engages the arcuate cam or rib 91 on the master wheel. As will be seen this shaft 46 is placed closer to the box and then the shaft 47 comes next and the shaft 48 last and it will also be seen that the jaws 87 and 88 associated with the shaft 46 are held in clamping position for a relatively short time or just for the length of the cam or rib 91. It will also be seen that a needle with its pulley 42 can readily pass between the jaw members of all three of the devices when the jaw members are open, and place a wire between the jaw members of the three devices. The shaft 47 which forms part of the wire twisting means is also supported for vertical movement and is pressed downwardly by a spring 92 to hold the bottom roller 93 against the upper face of the master wheel 51 and also against the cam or rib 94 of arcuate shape which extends upwardly from the upper face of the master wheel 51, this cam being located adjacent the cam 91 as shown in Figure 7. The shaft 47 as shown in Figures 20 to 25 carries jaw forming arms 95, one for each wire, and each arm 95 has a substantially semi-circular recess 96 in its upper edge for movably receiving a semi-circular jaw 97 which in its straight upper edge has a centrally arranged small recess 98 therein of semi-circular shape. A stationary jaw forming part 99 is associated with each jaw forming arm 95 and said part 99 is supported from a member 50 and the lower edge of each member 99 has a semi-circular recess 100 in its lower edge for movably receiving the semi-circular jaw part 101 which is hinged to the part 97 as shown at 102. These parts 97 and 101 are of a length sufficient to project well beyond the parts 95 and 99 as shown in Figure 23 and said parts 95 and 101 are yieldably held together or in clamping engagement with parts of a wire 44 by a spring 103 made in the form of a split ring band as shown in Figures 23, 24 and 25 with the band fitting in a groove in the outer circumference of the two parts with its ends placed under pins 104 passing across the ends of the groove 105. The member 101 is also formed with a small recess 98' in its flat edge and this recess 98' and the recess 98 in the part 97 are adapted to receive the ends of a shaft 106 with the upper member 101 fastened to the shaft by a set screw 107 as shown in Figures 23 and 25. The shafts 106 extend transversely in the parts of frame 35 carrying the shafts 46, 47 and 48 and are suitably supported therein and they are driven from the shaft 49 through means of the bevel gears 108 and said shaft 49 has a pinion 109 at its lower end, the hub of which is provided with substantially flat parts as shown at 110 in Figure 7 for engagement by the periphery of the wheel 51 and in such a manner that when a flat part is in engagement with the periphery the shaft 49 is held against turning movement. A portion of the periphery of wheel 51 is recessed as shown at 111 in Figure 7 and in this recessed part the periphery is formed with a small group of teeth 112 and a large group of teeth 113, the two groups being spaced apart as shown in Figure 7. These teeth 112 and 113 mesh with the pinion 109 so that the shaft 49 is first rotated or partly so by the teeth 112, then the shaft 49 remains at rest while the wheel 51 is rotated until the teeth 113 engage the pinion when the shaft 49 will be rotated to a considerable extent and, of course, the rotation of the shaft 49 rotates the shafts 106 through means of the beveled gears 108 and the rotary movement of each shaft 106 causes rotary movement of the jaw parts 97 and 101 while they are held between the parts 95 and 99, it being understood that these parts 95 and 99 do not clamp the parts 97 and 101 a sufficient amount to prevent rotary movement of the parts when the shaft 106 is rotated.

The upper face of each wheel 51 is formed with an annular groove 115, the outer side wall of which has a segment thereof formed with the rack teeth 116 for engaging the pinion 40 on the shaft 39 which operates the frame 36 which carries the needles. A segment of the inner wall of the groove is formed with the rack teeth 117 for meshing with the pinion 40, it being understood that these teeth 116 and 117 rotate the shaft 39 in opposite directions so as to cause the pinion 38 on the shaft 39 to first move the frame 36 to the left in Figure 3 and then to the right. A cam forming part 118 is formed on the inner wall of the groove 115 at one end of the rack teeth 117 and a similar cam 119 is formed on the inner side wall of the groove at the other end of the rack teeth 117. These cams are to engage substantially flat faces of a hub part 40' of the pinion 40 for preventing movement of the shaft 39 until the pinion is engaged by either the rack teeth 116 or the rack teeth 117.

In starting the formation of new bales the wires extend across each end portion of the central part of the box with the ends of the wires 44 held between the clamps 81 and 82 as shown in Figure 3 and Figure 16. Then as the hay or other matter to be baled is being discharged into the central part of the box the reciprocating plunger will press the material against those portions of the wires extending transversely across the box and as these wires are pressed upon by the material they are pressed outwardly into U-shape to extend around the end of the bale being formed and the sides thereof and as the wires are being pressed outwardly into U-shape, portions of the wires are drawn from the reels and through the needles, and as before stated the free ends of the needles carrying the pulleys 42 are located in or adjacent the slot 45 so that the wires will pass from the pulleys outwardly alongside of the inner wall of the box and between said inner wall and the side wall of the bale being formed, the free ends of the wires being firmly held by the clamping jaws 81 and 82.

The spring retainers 11 act to prevent the material being baled from moving inwardly with the plunger as the plunger makes its return stroke and the reciprocating plunger on one stroke forces the hay into one end part of the box and then on its other stroke into the other part of the box so that it is forming two bales at once. During this formation of the bales by the reciprocating plunger the rack bar 54 is, of course, moving with the plunger and it simply moves the toothed wheels 53 on the shafts 52 without moving these shafts, so that the wire handling mechanisms remain stationary excepting, of course, that the wires are being fed from the reels and positioned around the outer end and the two sides of each bale being formed. Both dogs 56 are in an inoperative position and are held in this position by the plungers 61 and both master wheels are held in locked position by the plungers 73. Each stroke of the plunger moves a bale a certain degree outwardly and this movement of the bale being formed rotates the wheel 79 which through the gearing in the member 77 and the gears 76 rotates the shaft 68 and then when the bale is of a length equal to that for which the gears in the member 77 have been set the cams 71 will raise the plungers 73 and 61 thus releasing the master wheel of each set and the dog so that the spring of the dog will move it into position to engage the notch 60 in the wheel 53 and then movement of the wheel 53 will be imparted to the shaft 52 which, in turn, imparts movement to the master wheel 51.

On the first part of the movement of each wheel 51 the cam 119 will free the hub 40' of pinion 40 and then the rack teeth 116 will engage the pinion 40 so as to cause the pinion 38 on shaft 39 to move the needle carrying frame 36 to the left in Figure 3 which will place portions of the wires 44 over the inner end of the finished bale and then the needles will pass portions of the wires between the jaw members 87 and 88 of the gripping means of which the first shaft 46 forms a part and also through the gripping members of the means of which the second shaft 47 forms a part so that two portions of each wire pass between the gripping parts of each of the shafts 46 and 47 and then the jaw parts of these members 46 and 47 are closed by the rollers 90 and 93 engaging the cams 91 and 94 which move the shaft 46 and 47 upwardly to cause the clamping means to clamp the wires. Shortly after the shafts 46 and 47 are raised by the cams 91 and 94 and before the pulley carrying ends of the needles reach the shaft 48 the roller of said shaft 48 drops off the rib 86 so that the jaws 81 move away from the jaws 82 thus freeing the cut ends of the wires though the two portions of each wire coming from the bale are held between the clamping means of the shafts 46 and 47. Then the pulley carrying ends of the needles pass between the jaws 81 and 82 and then the roller 84 of shaft 48 runs up the rib 86 so that the shaft 48 is raised to cause the jaws 81 and 82 to grip the wires placed by the pulleys 42 and to cut the wires by the knives 83. Thus the wires carried by the needles are separated from those portions which pass around the bale but said portions are held by the clamping means of the shafts 47 and 46.

Shortly after the shaft 48 is lowered by its roller 84 riding off the rib so that the jaws 81 and 82 are still open, the small group of teeth 112 come into engagement with the pinion 109 of shaft 49 which imparts a small amount of rotary movement to the shafts 106 so that the jaw members 97 and 101 are given a partial rotary movement which acts to jerk the ends of the wires from the jaws 81. This movement is only sufficient to pull the ends of the wires from off the jaws 81 around which they extend in the form of hooks as shown in Figure 16 and then the parts of the wires adjacent the pulleys of the needles are passed between the jaws 81 and 82 and then the jaws are closed by the roller 84 of the shaft 48 moving up on the rib 86 which as before stated grips the wires and also cuts the wires. The large group of teeth 113 then engage the pinion 109 which causes the shaft 49 to rotate the shafts 106 to a considerable extent which causes the members 97 and 101 to twist the two end portions of each wire encircling the bale together so that the end portions are firmly connected together by a considerable length of twist and this is done while the wires are being held by the clamping means of the shaft 46. The needle carrying frame is returned to its starting position or normal position by the rack teeth 117 engaging the pinion 40 and the cams 91 and 94 pass out of engagement with the rollers at the lower ends of the shafts 46 and 47 so that the jaw members of these shafts are open to release the wires which are encircling the bale. During this movement of the master wheel 51 the cams 71 of shaft 68 have moved from under the disks of the plungers 61 and 73 so that these plungers are riding upon portions of the master wheel and the dog 56 so that as soon as the dog has been forced out of the notch 60 by reverse movement of the toothed wheel 53 by the rack 54 of the plunger 9, the plunger 61 will drop into the hole 62 of the dog and the plunger 73 will drop into the hole 75 of the master wheel so as to hold these parts stationary as the wheel 53 is moved by the rack 54 of the reciprocating main plunger 9. It will be understood that the wire handling mechanism is operated from the master wheel while the said master wheel is making one revolution by being connected with the wheel 53 by the dog 56, which wheel 53 is making one revolution as the main plunger 9 makes one stroke away from the finished bale so that when the plunger 9 starts its return stroke the wheel 53 will be rotated in a different direction so as to move the dog 56 to releasing position in which it will be held by the plunger 61.

Then the parts are ready for the formation of a new bale at each end of the press box and the new bales being formed push out the finished and tied bales from the outer ends of the parts B" of the box.

I also provide means for chopping the hay being introduced into the central portion of the box and such means includes a knife carrying reel 125 placed over the central portion of the box and the blades of which cooperate with a stationary blade 126 at the upper edge of the side of the central portion of the box over which the hay passes so that when this reel is rotated it will cut the hay entering the apparatus and before it drops into the box where it is engaged by the plunger. This reel is preferably driven from the tractor, when the tractor is arranged as shown in Figure 2 through means of the shafting and gearing shown generally at 127, the shaft 127' engaging and being connected with a take-off shaft of the tractor. A hood 128 covers the upper end of the central portion of the box and has its front open to receive the hay from conveying mechanism shown generally at 129 which picks up the hay from the windrows and conveys the hay or other material into the open mouth of the hood where the hay is engaged by the cutting means so that it is chopped before dropping into the box where it is engaged by the plunger 9 for forming the hay into bales as before described.

Instead of providing the reel 125 for chopping the hay into short lengths I may provide the cutting means shown in Figures 27 and 28, which means includes a knife 130 on the top of the plunger 9 which engages the hay dropping into the central portion of the box and cuts the same as the plunger is reciprocating back and forth in the box, the hay being introduced through the open top 131 of the box when the hay is cut by the knife as the plunger passes across the opening. As will be seen in Figure 27 the knife has both edges beveled so that the knife will cut on both strokes of the plunger. Also and as shown in Figure 28 a beater or feeder reel 132 is placed in the hood 128' of the apparatus for forcing the hay through the hood and through the opening 131.

The housing encloses the major portion of the movable parts of the apparatus so as to protect the same from dirt and dust and other foreign matter and the housing contains lubricant so that the parts are thoroughly lubricated.

The conveyor 129 can be driven from a portion of the drive means 127 as shown at 133 in Figure 1.

The shafts of the wire handling devices may be made so that they can be adjusted as to their lengths as shown generally at 134 and they pass through enlarged holes in the top of the housing which are closed by the bushings 135 through which the shafts pass, as shown in Figures 3, 15, 17, 18 and 20, so that by removing these bushings the shafts with the springs and rollers can be pulled through the openings and reinserted through the openings into the housing.

The plunger 9 reciprocates smoothly and without jerks as the pressure of the material being baled tends to start the plunger on its return stroke so that this pressure of the material on the plunger tends to cause the gearing to reverse to drive the plunger on its return stroke, such as the pinions 23 engaging the two sets of teeth 27 and 28 on opposite sides of the grooves 24 of the wheels 25.

The construction of the dogs 56 and the parts associated therewith make it impossible for the needles to remain in position across the box to be engaged by the plunger 9 so that there is no danger of the needle mechanism being injured by the plunger as such mechanism will always be out of the way of the plunger before the plunger completes its stroke.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a baling apparatus including a plunger, wire handling means for tying wires around the bale and means for actuating the wire handling means including a master wheel, a shaft rotatably supported and to which the master wheel is connected, a toothed wheel rotatably supported on the shaft, a rack connected with the plunger and engaging the teeth of said toothed wheel, a spring-pressed dog pivotally connected with the shaft and engaging a notch in the toothed wheel for communicating movement of the toothed wheel to the shaft when the plunger is moving in one direction, the dog moving out of the notch when the toothed wheel is being moved by the plunger when the plunger moves in the opposite direction, latch means for holding the dog in inoperative position, latch means for holding the master wheel against movement, a rotary shaft, cams thereon for moving the two latch means to releasing position, and adjustable means actuated by the movement of the bale being formed for rotating the cam shaft.

2. Wire tying means for a baling apparatus which includes a master operating wheel, such means including a needle carrying frame, a track for the same, means for moving the frame from the master wheel, wire carrying reels on the frame, the wires of which pass through the needles, first wire clamping means for clamping the wires, a second clamping and wire twisting means and a third wire clamping and cutting means, said third means cutting and holding the ends of the wires after other portions of the wires have been fastened about a formed bale, means on the master wheel for causing the first clamping means to grip the wires after the needles have placed wires in said clamping means and to cause the second clamping means to grip the wires after the needles have passed the same, means on the master wheel for releasing the third clamping means before the needles reach the same, to release the previously cut wires and to permit the needles to place other portions of the wires in said third clamping means, after which said means last-mentioned on the master wheel moves the third clamping means to gripping position and cuts the wires, means actuated by the master wheel for operating the twisting means of the second clamping means to twist the wires passing around the bale, after which the first and second clamping means are moved to inoperated position and the needle carrying frame is moved to its starting point to place the wires held by the third clamping means in the clamping means of the second and first sets.

3. Wire handling means for a baler press comprising a needle and reel carrying frame supported for sliding movement across the box of the press, said frame normally lying to one side of the box, needles attached to the frame and each including a member of substantially U-shape in cross section with the space formed by the limbs of the U opening out to one side of the needle, a pulley at the free end of each needle and slightly projecting from the open side, the wire from each reel passing through the needle and over the pulley, a vertically arranged shaft at the opposite side of the box and carrying jaw members, stationary jaw members associated with the jaw members of the shaft, a second vertically arranged shaft carrying jaw members, stationary jaw members associated with the jaw members of the second shaft, rotary jaw members associated with the jaw members of the second shaft, a transverse shaft carrying the rotary jaw members of each set, a third vertically arranged shaft having jaw members thereon, a knife carried by each jaw member, for cutting a wire after a part has been hooked around the jaw member of the third shaft, stationary jaw members associated with the knife carrying jaw members, a fourth vertically arranged shaft, gearing connecting the fourth shaft with the transverse shafts, a master wheel, means actuated thereby for moving the needle carrying frame first from its normal position across the box to place the wires in the clamping means and then to return the frame to its normal position, the bale being formed pressing those portions of the wires extending across the box outwardly so that said wires will extend around the outer end and the sides of the bale, the ends of the wires being held in the clamping means of the third shaft with portions of the wires passing between the jaw members of the first and second shafts without being engaged by said jaw members, first movement of the needle carrying frame passing portions of the wires across the inner end of the completed bale and between the jaw members of the first and second shafts, means on the master wheel for raising said shafts to cause the jaw members thereof to grip the wires which now extend around the bale, means on the master wheel for first lowering the third shaft with the hooked ends of the wires on the jaws of the third shaft, means for rotating the fourth shaft by the master wheel for causing movement of the rotary jaw members of the second shaft to pull the hooked ends of the wires from the jaw members of the third shaft, after which the pulley carrying ends of the needles pass between the jaw members of the third shaft, after which the third shaft is raised by the master wheel to hook portions of the wires just laid by the needle over the jaws of the third shaft and to grip portions of such wires between the jaws and their associated stationary jaws and to cut such wires, the upward movement of the third shaft causing the jaw members thereof to rise above the needles, after which the needles pass back to the starting point and placing the wires between the jaw members of the second and first shafts, then across the box, the fourth shaft being rotated to twist the wires that have been placed around the bale before the return of the needles and the first and second shafts moving downwardly before the needles pass them.

RALPH A. OPENSHAW.